United States Patent
Sugiyama et al.

(10) Patent No.: US 7,407,727 B2
(45) Date of Patent: Aug. 5, 2008

(54) ELECTRODE USED FOR A NON-AQUEOUS ELECTROLYTE SECONDARY BATTERY AND A NON-AQUEOUS ELECTROLYTE SECONDARY BATTERY USED THE SAME FOR A NEGATIVE ELECTRODE

(75) Inventors: Hiromu Sugiyama, Suita (JP); Hideyuki Morimoto, Gunma (JP); Atsushi Ueda, Hirakata (JP); Shigeo Aoyama, Otsu (JP)

(73) Assignee: Hitachi Maxell Ltd., Ibaraki-Shi (JP)

( * ) Notice: Subject to any disclaimer, the term of this patent is extended or adjusted under 35 U.S.C. 154(b) by 423 days.

(21) Appl. No.: 10/671,460

(22) Filed: Sep. 29, 2003

(65) Prior Publication Data
US 2005/0074671 A1    Apr. 7, 2005

(30) Foreign Application Priority Data
Sep. 30, 2002    (JP)    ............ P 2002-286315

(51) Int. Cl.
*H01M 4/72*    (2006.01)
(52) U.S. Cl. ..................... 429/233; 429/238
(58) Field of Classification Search ............ 429/234, 429/245, 231.95, 145, 233, 238
See application file for complete search history.

(56) References Cited

U.S. PATENT DOCUMENTS 5,641,591 A * 6/1997 Kawakami et al. ....... 429/231.5
6,432,585 B1 * 8/2002 Kawakami et al. .......... 429/233
7,138,208 B2 * 11/2006 Tanjo et al. ................. 429/145
2003/0180619 A1    9/2003 Tamura et al.

FOREIGN PATENT DOCUMENTS

| EP | 1246278 | * 10/2002 |
|---|---|---|
| EP | 1246278 A1 | 10/2002 |
| JP | 2001-68094 A | 3/2001 |
| JP | 2001-256968 A | 9/2001 |
| JP | 2001-283834 A | 10/2001 |
| JP | 2002-83594 A | 3/2002 |
| JP | 2002-279974 A | 9/2002 |

OTHER PUBLICATIONS

Manahan, S.E. "General Applied Chemistry," PWS, Boston, 1982, periodic table inside the cover.*

* cited by examiner

*Primary Examiner*—Mark Ruthkosky
(74) *Attorney, Agent, or Firm*—Birch, Stewart, Kolasch & Birch, LLP (57) ABSTRACT

An electrode according to the invention can provide a non-aqueous electrolyte secondary battery having an ability to release a volume expansion at the time of charge and discharge as well as the time of a cycle. The electrode comprises a current collector made of a material which is not alloyed with Li, and a dot pattern 2 of a metallic material able to be alloyed with Li formed on the current collector. At the time of charge, since the volume expansion of each dot 3 is carried out so as to bury adjoining crevices 4 between the dots, a stress generated is released, thereby degradation of an electrode being avoided. Each dot may also be made into porosity.

12 Claims, 9 Drawing Sheets

ELECTRODE USED FOR A NON-AQUEOUS ELECTROLYTE SECONDARY BATTERY AND A NON-AQUEOUS ELECTROLYTE SECONDARY BATTERY USED THE SAME FOR A NEGATIVE ELECTRODE

BACKGROUND OF THE INVENTION

1. Field of the Invention

This invention relates to an electrode used for a non-aqueous electrode secondary battery, in which the dot pattern of metallic material able to be alloyed with Li on a current collector, and the non-aqueous electrolyte secondary battery using said electrode for the negative electrode.

2. Description of the Related Art

Negative electrodes for a non-aqueous electrolyte secondary battery described in JP 2001-68094-A and JP 2001-256968-A have a thin film comprising metallic materials alloyed with Li formed on a current collector of a material which is not alloyed with Li.

According to JP 2001-68094-A, a Sn thin film is formed on a current collector by an electric plating method.

According to JP 2001-256968-A, a thin film comprising a material containing Sn, Zn, Sb or the alloy as major components is formed on copper foil by an electric plating method.

Moreover, according to JP 2002-83594-A, it is described that an electrode having an active material thin film which is formed in a pattern of separated pillars made by breaks formed in the direction of thickness on a current collector and volume expansion of the active film is reduced around the breaks when the active material is intercalated by Li ions.

When the electrodes are prepared by the electric plating method, the resulting thin film can be formed by direct electrodeposition of objective metal or alloy on the current collector. Consequently, the electrodes which are excellent in the adhesion of an active material and a current collector can be obtained, compared with electrodes made by the coating method.

Also, it is more advantageous to get a cheaper manufacture cost, compared with the coating method. However, since the obtained metal-plating layer becomes very precise, an electrode tends to be influenced by volume expansion of the active material due to intercalation of Li ions, and consequently there is a fault such as a notable generation of expansion and crack in the electrode.

In the latter case, there are the following problems.

At the current collector side of the active material thin film, pillar-shaped objects are close to each other and there are not any crevices which serve as a stress relaxation place at the time of expansion of an active material.

In addition, since the diameter of each pillar-shaped object and width of the gap cannot necessarily be controlled freely, at an time of electrical charge and discharge and a cycle time, it is difficult to make the volume expansion in the active layer reduced, resulting in no sufficient utilization of the active material and no good maintenance of the active material characteristics. Therefore, it is difficult to provide an electrode which fully satisfies a load characteristic and a cycle characteristic even in the electric discharge with large electric current. Therefore, the technical establishment for controlling volume change of the active material is desired more regularly and precisely.

Accordingly, it is a first object of this invention to provide an electrode with an ability to reduce a volume expansion at the time of the electric charge and discharge and the cycle, and also to avoid the active material separation from the current collector due to the electric charge and discharge.

Further, it is another object of this invention to provide an electrode which can contribute to the improvement in characteristics of the electric charge and discharge efficiency of a battery and the rate of cycle capacity maintenance.

Also it is a further object to provide an electrode which can be charged and discharged with a large electric current and to provide a non-aqueous electrolyte secondary battery using said electrode for a negative electrode.

SUMMARY OF THE INVENTION

After a result of repeated examinations for solving the above-mentioned problems, this invention is based on and completed by the finding that the adhesion of a current collector and an active material can be raised by forming a refined pattern of a metallic material alloyed with Li and also thereby crevices are formed in the active material to commit as a stress relaxation place at the time of particle expansion and contraction due to-the electric charge and discharge.

Figure 1:
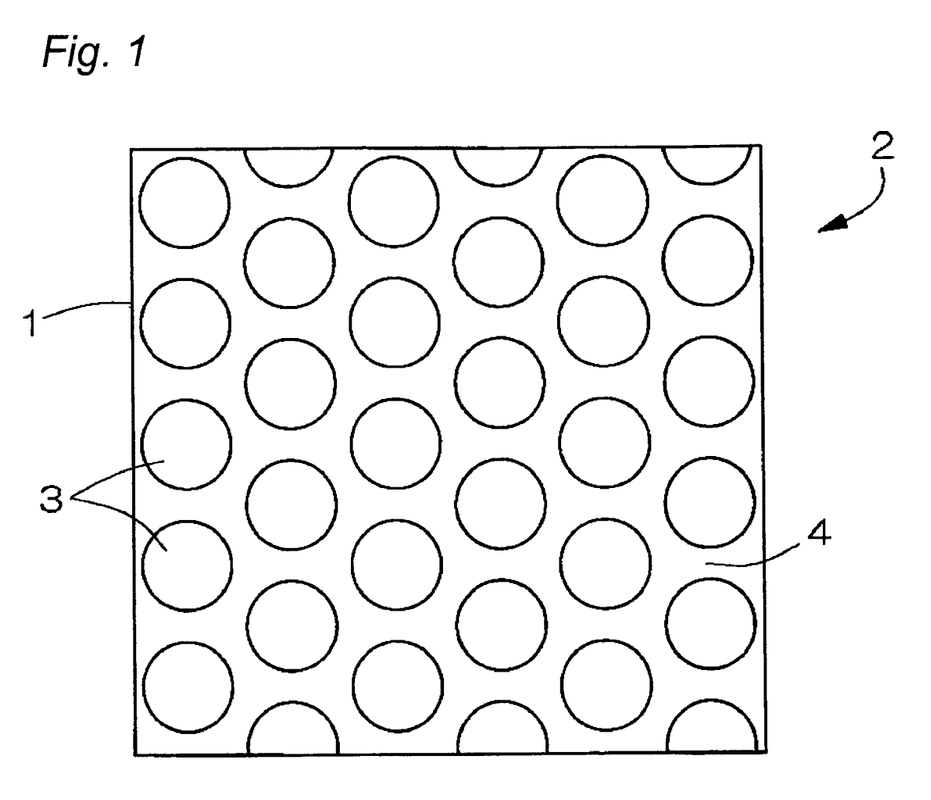
FIG. 1 is a plan view of the plan of the electrode according to the invention.
Figure 2:
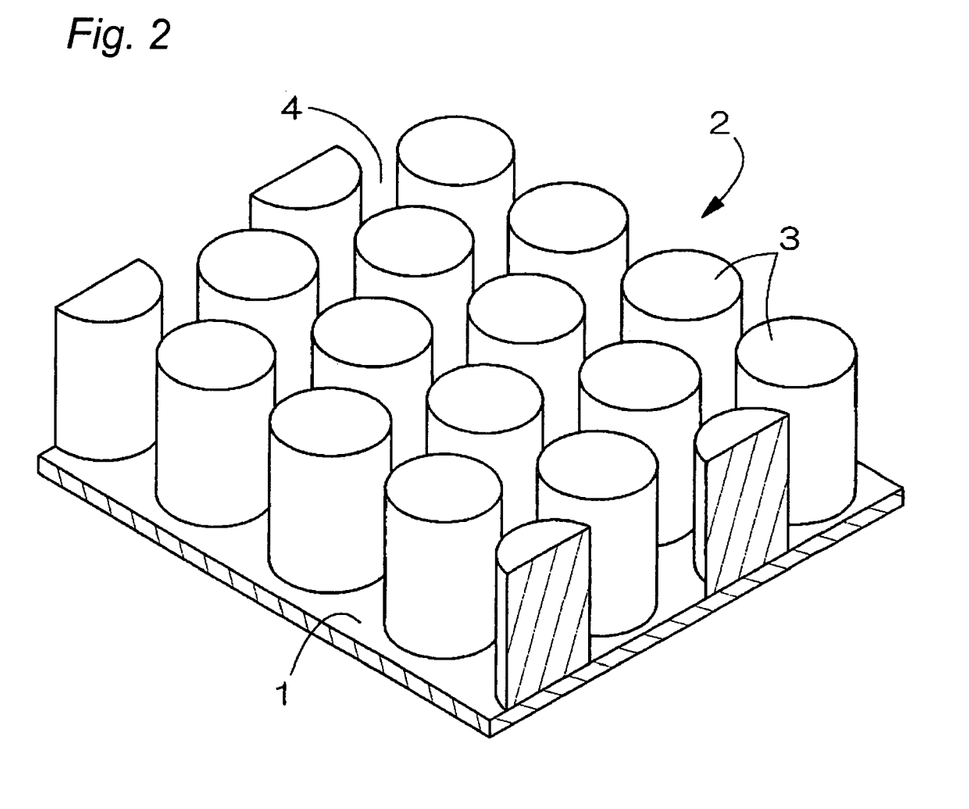
FIG. 2 is a perspective view of the electrode of this invention.

According to a first aspect of the invention, there is provided an electrode which comprises a dot pattern 2 of metallic materials containing a metal or its alloy able to be alloyed with Li or its alloy, which dot pattern is formed on a current collector 1 which consists of material which is not alloyed with Li, as shown in FIGS. 1 and 2.

Moreover, the electrode is characterized in that each dot 3 of the metallic material on the electrode has a diameter of 1-500 micrometers, and the pattern is formed so as to have a coverage rate of dots on the current collector maintained 50-90%.

A current collector 1 is not limited especially if it consists of metals which are not alloyed with Li. For example, a metallic foil, an electrolysis foil, a rolling foil, an embossing article, a foaming current collector, etc. can be used. Here, Cu, Ni and stainless steel, etc. can be used as "a material which is not alloyed with Li". It is preferable from a viewpoint of increasing adhesion with a thin film of the current collector to use a metallic foil containing an element which can be alloyed with a metal constituting said dot pattern, for example copper etc.

"The metal able to be alloyed with Li" includes either one element(s) of the IVb group (element(s) of group 14). When forming a dot pattern especially by the electric plating, Sn can be preferably used. Furthermore, the metallic material may be an alloy of said IVb group element (element of group 14) and other elements, which can be selected from the group consisting of Bi, Cu, Fe, Ni, Zn, and Ag besides IVb group element (element of group 14). As for composition of the alloy, it is preferable to contain 10% or more of IVb group element (element of group 14) and the remainder of additional metals, such as said Bi etc. In addition, the alloy may contain the elements other than the above-mentioned additional metal.

As a structure of the dot pattern 2 in this invention, as shown in FIGS. 1 and 2, dots 3 can be arranged like a staggered arrangement on a current collector 1. Grid arrangement may be also used for the dot pattern. Then when Li ion is intercalated to the metallic material alloyed with Li at the time of charge, each volume expansion of the dots 3 can come out so as to fill the adjoining crevices 4 between the dots. Therefore, stress by said intercalation is released and cracks generated in the surface of an electrode can be prevented effectively.

Furthermore, a lateral expansion of the dots can make an expansion coefficient in the height direction of the dots greatly reduced, so that the expansion of electrodes and cells can be prevented. Those crevices 4 are again formed by the electric discharge and at the time of the followed charge, they can function as a stress relaxation place in the same way as the first time charge.

As described above, the electrode according to this invention can control effectively crack generating and separation between the current collector and the active material by stresses due to volume change at the time of electric charge and discharge, while fully securing a sufficient reaction area of the electrode. Therefore, the electrode according to the invention having an excellent efficiency of charge and discharge as well as an excellent rate of capacity maintenance in a cycle, can provide a non-aqueous electrolyte secondary battery with an ability of charge and discharge even at the time of large electric current as well as a high capacity.

In this invention, the form relating to the dots 3 is not limited to a special type. However, in order to diffuse a stress concentration generated inside at the time of volume change as much as possible, it is preferable to use a column or circular cone having a round corner at a side or upper surface thereof, and a multiple pillar or a multiple cone. Among them a cylindrical or cone-shaped one is more preferable. Although the height of dots does not have especially restriction, it is preferable to be in the range of about 1-500 micrometers, and in order to have a high capacity, it is preferable to be 2 micrometers or more. Further, the height of dots of less than 15 micrometers can improve a rate of capacity maintenance in a cycle.

Moreover, a diameter and a suitable range of the occupancy rate of the dots on the current collector are evaluated as follow.

For example, as for Sn particle, when Li ion is intercalated at the time of charge, if it is set to x=4.4 in the composition LixSn, it is theoretically figured out that a coefficient of volume expansion of particles becomes 260% from the following formula 1.

Coefficient of volume expansion=$(V_1-V_0)/V_0 \times 100(\%)$ (Formula 1)

$V_0$=volume before charge, $V_1$=volume after charge

Then, calculation of an expansion coefficient of dots for evaluating volume change can be made from the above coefficient of volume expansion. According to a result of the calculation, it is possible to calculate intervals of dots such that all the crevices 4 in the dot pattern 2 function as a stress relaxation place so as to have the rate of crevice of 0% at the time of full charge. That means the electrode having an ability to make the rate of crevice up to 0% when charge is completed, will become in a state where all the crevices 4 in the electrode will be filled up with active material at the time of discharge starting. Therefore, according to the invention, the current collection can be taken among all active materials inside the electrode at the early stage of electric discharge and the capacity can be stably kept. On the other hand, the side of dots 3 also comes to contact an electrolyte as the electric discharge progresses and the crevices 4 are re-formed. Therefore, intercalated Li ions become easy to be detached, and the active material capacity can be taken out efficiently.

When calculating a suitable size of dots that can not get any cracks due to expansion inside dots, it is figured out that a diameter of the dot should be 500 micrometers or less, more preferably 200 micrometers or less. When setting the height of dots to 10 micrometers or less, a diameter of a dot is preferably set to 40 micrometers or less.

In the above-mentioned dot pattern, an interval between adjoining dots is defined by active material occupancy area in an electrode. If the occupancy area of an active material becomes small, an interval of each dot will become large relatively. Thereby, sufficient crevices for releasing a stress by volume change due to intercalation/detachment of Li can be obtained. Although such an electrode can make it possible to control the volume change in the height direction, if the occupancy area becomes too small, the amount of active materials per unit area of the electrode will decrease, resulting in loss of merit due to the increasing capacity. From this aspect, it is preferable to make the occupancy rate of dots, i.e., the rate of dot area with respect to the area of the electrode to 50% or more, and more preferably the dot pattern may be designed to have said rate of 70% or more. On the other hand, if the occupancy area is enlarged too much, the interval of each dot will become too narrow, and thereby crevices for releasing a stress will be inadequate. Therefore, it is preferable to make the occupancy rate to 90% or less.

BRIEF DESCRIPTION OF THE DRAWINGS

The above and other objectives and features of the present invention will become more apparent from the following description of preferred embodiments thereof with reference to the accompanying drawings, throughout which like parts are designated by like reference numerals, wherein.

DETAILED DESCRIPTION OF THE PREFERRED EMBODIMENTS

Figure 3A:
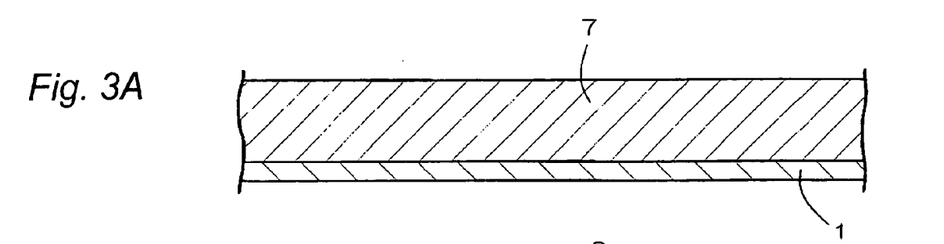
FIGS. 3A to 3D are sectional views showing the steps of a first manufacture method of the electrode according to this invention.
Figure 3B:
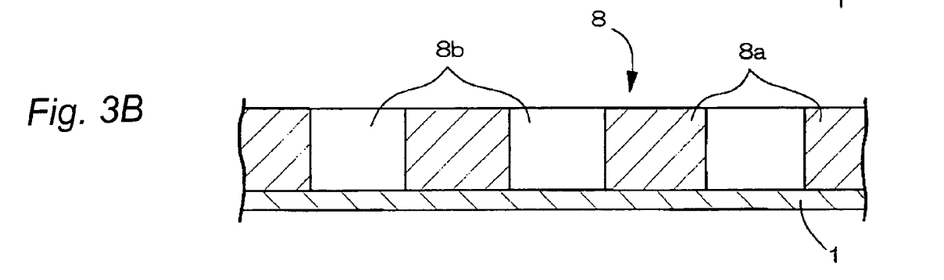

An example of a manufacture method of an electrode according this invention will be explained referring to FIGS. 3A to 3D. In addition, the manufacture method is explained below by making into an example an electrode with which the dot pattern 2 made from Sn alloy was formed on a foil of copper, which is a current collector 1. First, as shown in FIG. 3A, after applying a photo-resist 7 on the foil of copper used as the current collector 1, a masking and an exposure processing etc. are performed thereon. Then, a non-exposed portion is dissolved and removed by etching processing. Then, the pattern resist 8 which has a pattern corresponding to the crevice 4 of dots 3 as shown in FIG. 2 is formed on the current collector 1 in FIG. 3B. That is, the portion which is not covered by resist parts 8a is a circle opening 8b which is corresponding to the cylindrical dot 3.

Figure 3C:
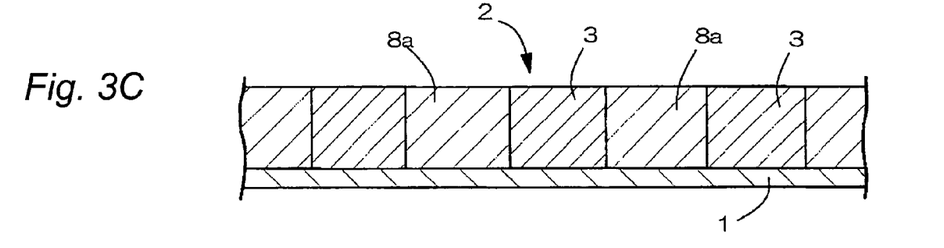

Then, as shown in FIG. 3C, a surface of the current collector 1 which is not covered by resist parts 8a is subjected to electrodeposition of a Sn alloy etc. within the limit of the height of resist parts 8a, by the electroplating method and the cylindrical dot 3 is formed thereon.

Figure 3D:
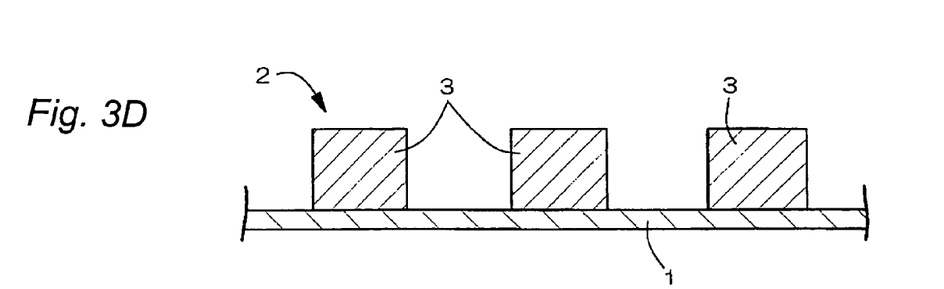

The resist parts 8a is removed after an electrodeposition, as shown in FIG. 3D and 2, to get a large number of the dots 3 like a refined pattern on the foil of copper, the current collector 1.

Figure 4A:
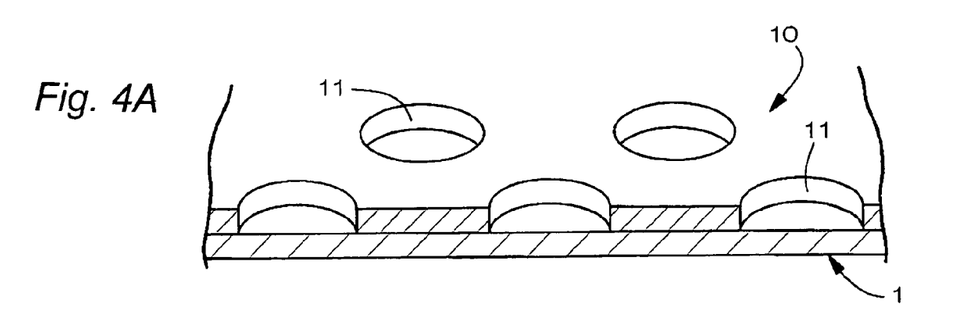
FIGS. 4A to 4E are sectional views showing the steps of a second manufacture method of the electrode according to this invention.
Figure 4B:
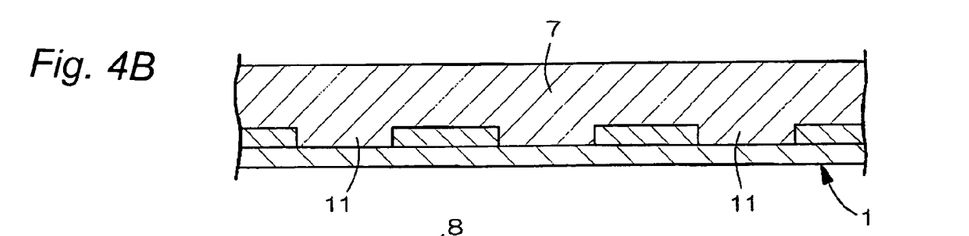
Figure 4C:
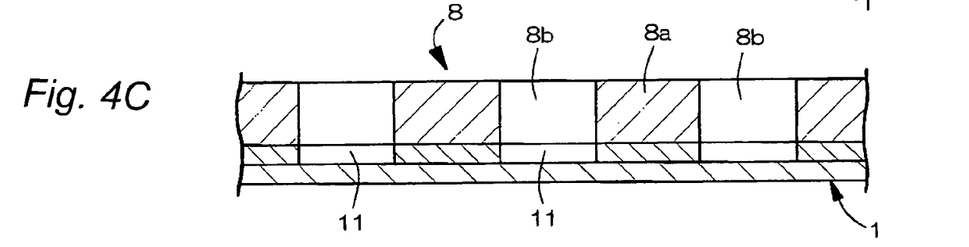
Figure 4D:
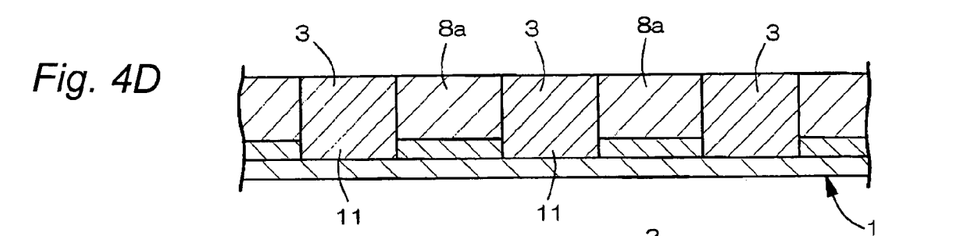
Figure 4E:
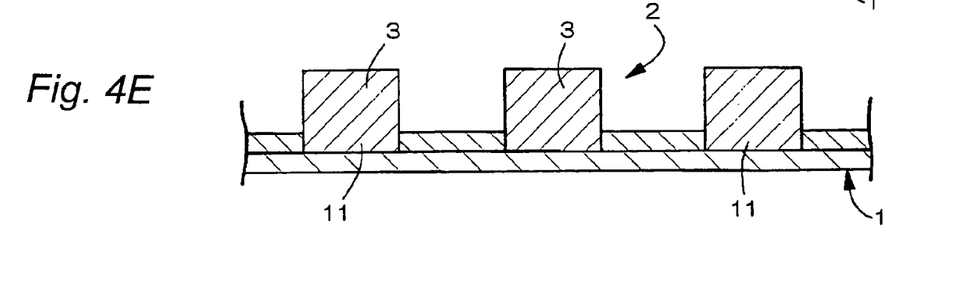
Figure 5A:
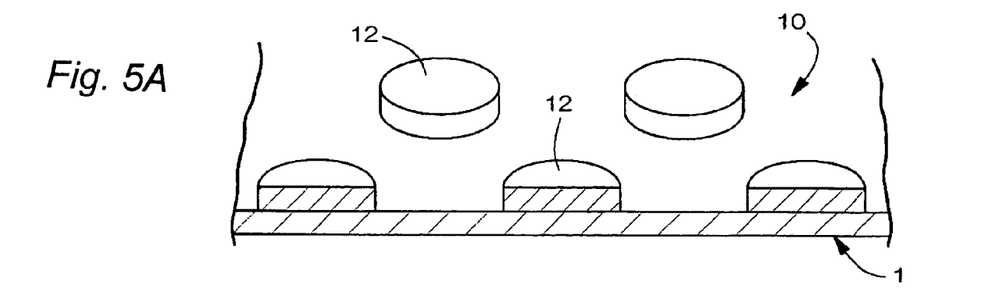
FIGS. 5A to 5E are sectional views showing the steps of a third manufacture method of the electrode according to this invention.

Moreover, as shown in FIGS. 4A and 5A, the refined convex-concave pattern 10 may be preformed on a current collector 1. Thereby, formation of the dot pattern 2 is easily controllable. In such a current collector 1, the concave-convex pattern 10 is preferably formed with the same material as the current collector 1. For example, the concave-convex pattern 10 may be made by an electroplating method. As a method of preparing an electrode by using the current collector 1 having such a concave-convex pattern, FIGS. 4 and 5 can show typical methods.

In case of the method in FIG. 4, a foil 1 of copper having many independent concave patterns 10 was formed in the surface thereof by electrodeposition processing or YAG laser etching processing, as a current collector (FIG. 4A). Here, the concave-convex pattern 10 was formed by electrodeposition processing. Each concavity portion 11 which constitutes the concave-convex pattern 10 forms a circle form in a plane viewpoint, and is formed in the shape of a cave-in with a depth size of several micrometers.

Next, as shown in FIG. 4B, after applying a photo-resist 7 on the current collector 1, a masking and an exposure processing etc. are applied thereto. Furthermore, the non-exposed portion is dissolved and removed out by etching processing, and the pattern resist 8 provided with resist parts 8a as shown in FIG. 4C is formed on the current collector 1. Here, the resist parts 8a are formed on the current collector 1 except concavity portion 11. The resist parts 8a, form a pattern with the crevice 4 (refer to FIG. 1) corresponding to the dots 3 and the non-resist parts which are not covered by resist parts 8a are used as crevices or openings 8b of circle corresponding to the cylindrical dot 3, which is connecting to concavity portions 11.

Hereafter, like the above-mentioned, as shown in FIG. 4D, dots 3 are formed, and resist parts 8a are removed after the electrodeposition process. Then, as shown in FIG. 4E, a refined dot pattern 2 is formed on the current collector 1 to get an electrode.

In case of the electrode shown in FIG. 4E, since base parts of the dot 3 are entering into concavity portions of a current collector 1, compared with the electrode shown in FIG. 2. Thereby, an active material and the current collector 1 cannot be separated easily. Therefore, an electrode excellent in cycle characteristics can be obtained. However, if the amount of filling of an active material tends to be increased for increasing the capacity, there happens antagonism between a stress by which the concavity portion 11 of the current collector 1 holds down a part for the base of the pillar-shaped dots 3 and an expansion coefficient of the dots when an expansion coefficient of the dots 3 are beyond a threshold. Consequently, there is a possibility of separation or exfoliation between the dots and the current collector 1.

Figure 5B:
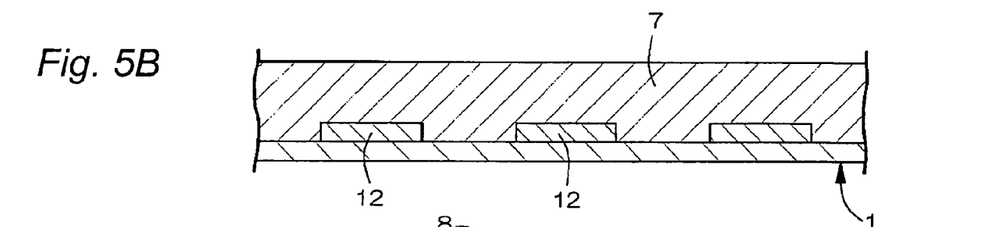
Figure 5C:
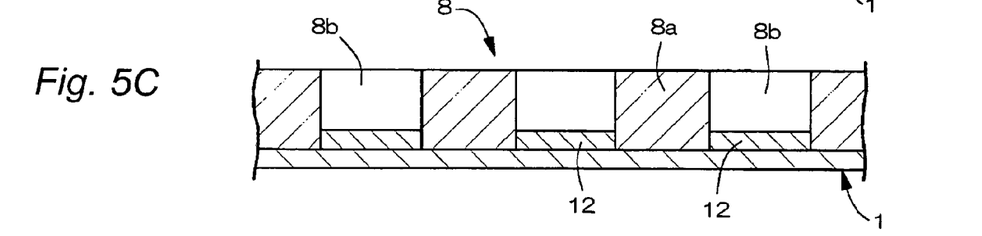
Figure 5D:
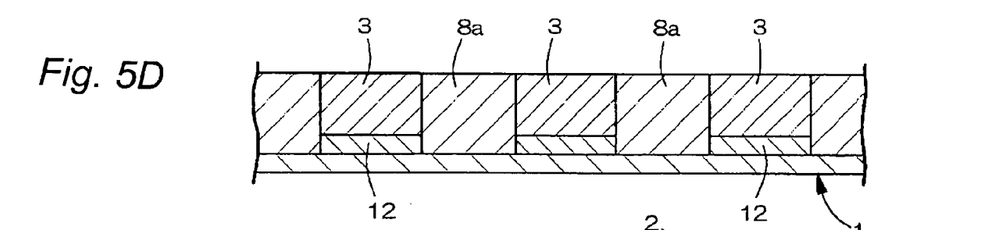
Figure 5E:
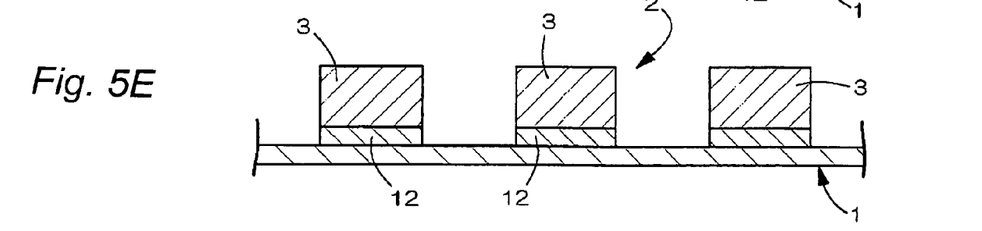
Figure 6A:
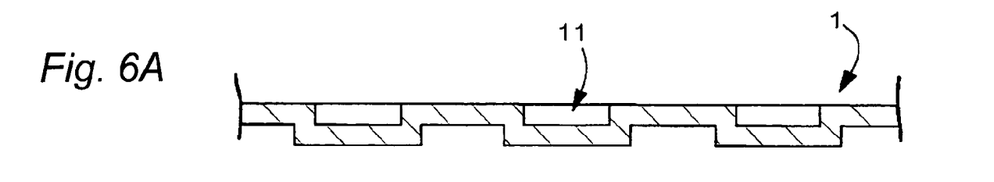
FIGS. 6A to 6E are sectional views showing the steps of a fourth manufacture method of the electrode according to this invention.
Figure 6B:
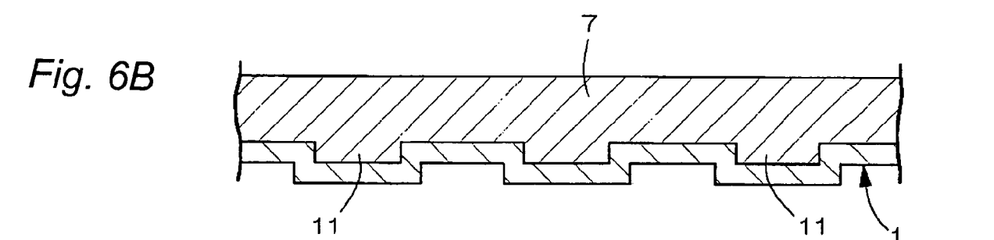
Figure 6C:
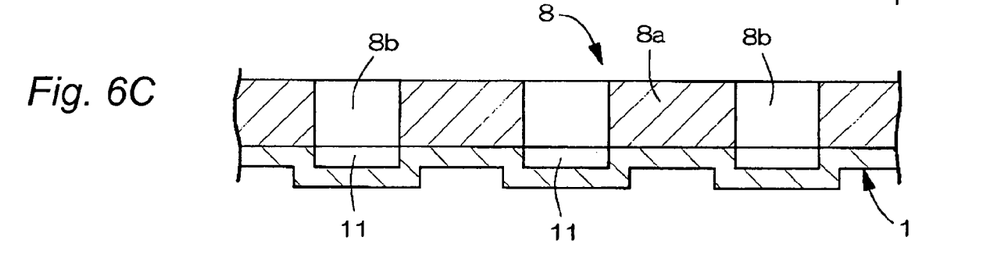
Figure 6D:
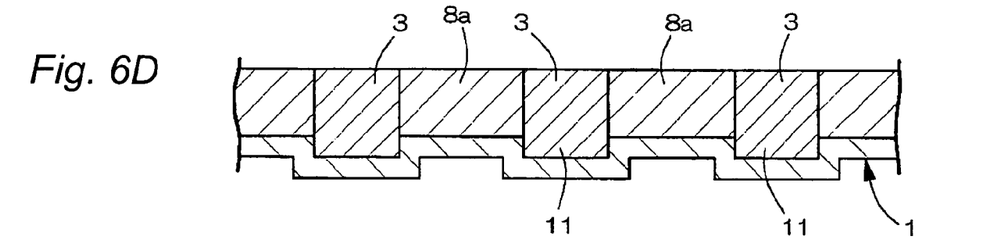
Figure 6E:
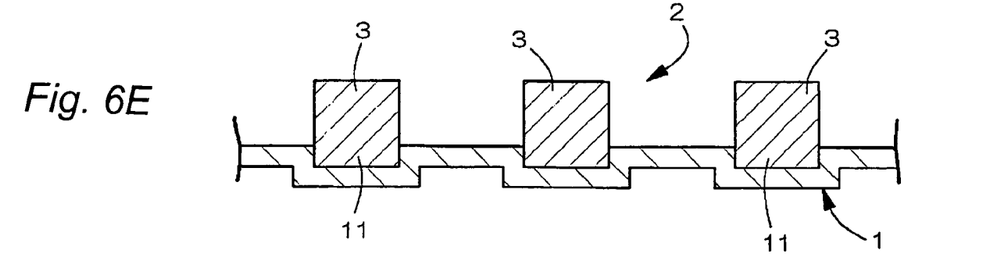
Figure 7A:
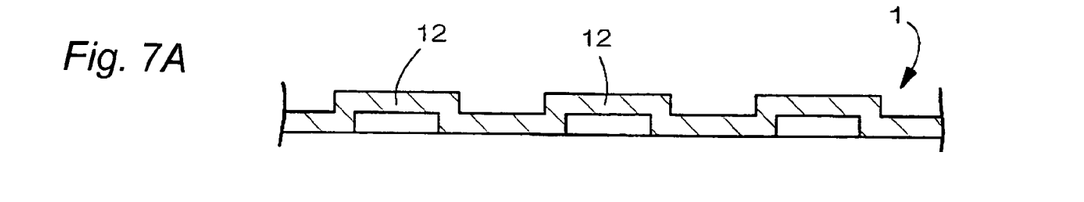
FIGS. 7A to 7E are sectional views showing the steps of a fourth manufacture method of the electrode according to this invention.
Figure 7B:
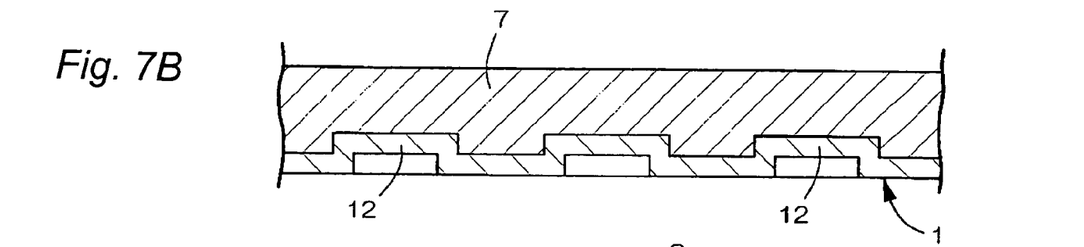
Figure 7C:
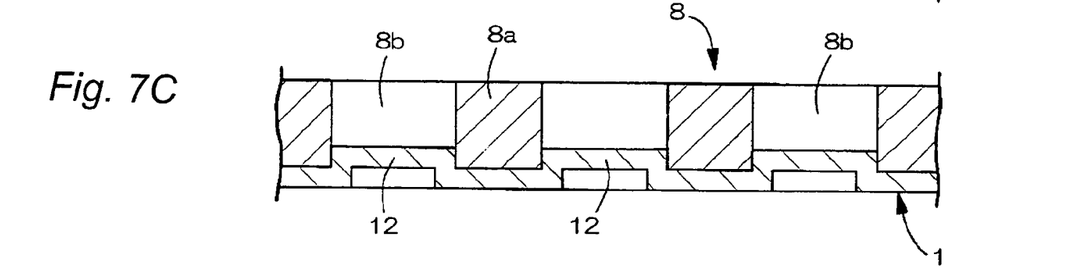
Figure 7D:
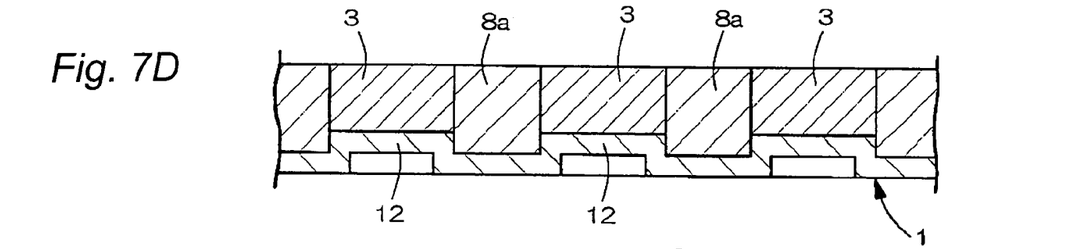
Figure 7E:
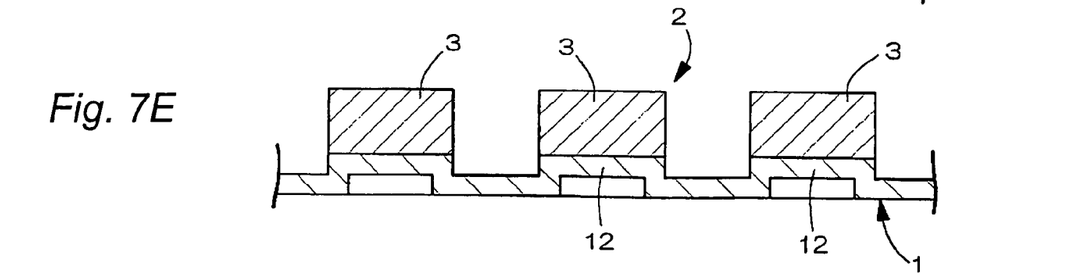

As a solution means of this problem, as shown in FIG. 5A, it is possible to form in the surface of a current collector 1 the concave-convex pattern 10 consisting of independent convex sections 12, and to form dots 3 on the upper part of this convex section 12, as shown in FIG. 5E. In detail, firstly a current collector with many concave-convex patterns 10 comprising independent convex is formed by electrodeposition processing or YAG laser etching processing (FIG. 5A). Each convexity portion 12 which constitutes the concave-convex pattern 10 here is in a form of circle form with a plane viewpoint, and is formed so that it may project in a height of several micrometers toward a direction in which the dot pattern 2 is forming, i.e., in the upper direction. Next, as shown in FIG. 5B, after applying a photo-resist 7 on the current collector 1, a masking and an exposing processes etc. are carried out thereon. Furthermore, the non-exposed portion is dissolved and removed out by an etching processing to form resist parts 8a as shown in FIG. 5C.

Then, as shown in FIG. 5D, the surface of the convex section 12 of a current collector 1 is subjected to an electrodeposition of Sn alloy etc. by the electrolysis coating method, and the cylindrical dots 3 are formed. If the resist parts 8a are removed after the ectrocrystallization, as shown in FIG. 5E, an electrode with a refined dot pattern 2 formed on the current collector 1 can be obtained.

According to the electrode as shown in FIG. 5E, since the dots 3 were formed on the convex section 12 of the current collector 1, a stress relaxation place at the time of expansion can also be given to a downward part from the skirt of the dot as well as horizontal direction and upper direction of the dot. It can contribute to an improvement in characteristics of the electric charge and discharge efficiency and the rate of cycle capacity maintenance in the resulting battery. Moreover, exfoliation or separation of the active material from the current collector can be avoided further.

FIG. 6 shows an electrode with a current collector having a concave-convex pattern made by a mechanical processing, on which a dot pattern may be formed as mentioned above. That is, after applying a photo-resist 7 to the surface of a current collector (FIG. 6A) in which the concave-convex pattern 10 was formed (FIG. 6B), a masking and an exposure processing etc. are carried out thereon. Furthermore, the non-exposed portion is dissolved and removed out by etching processing, and resist parts 8a as shown in FIG. 6C is formed on a current collector 1. Then, as shown in FIG. 6D, the surface of concavity portion 11 of the current collector 1 is subjected to an electrodeposition process of the Sn alloy etc. by the electroplating method, and to form cylindrical dots 3. If resist parts 8a are removed after the electrodeposition step, as shown in FIG. 6E, an electrode with the dot pattern 2 formed on concavity portions 11 of the current collector 1 can be obtained.

FIG. 7 shows an electrode with the dot pattern 2 formed on the convex sections 12 of a current collector, and other points are substantially the same as those of FIGS. 6 and 5. Therefore, the same number indicates the same parts as FIGS. 6 and 5 and the explanation is omitted.

Figure 8A:
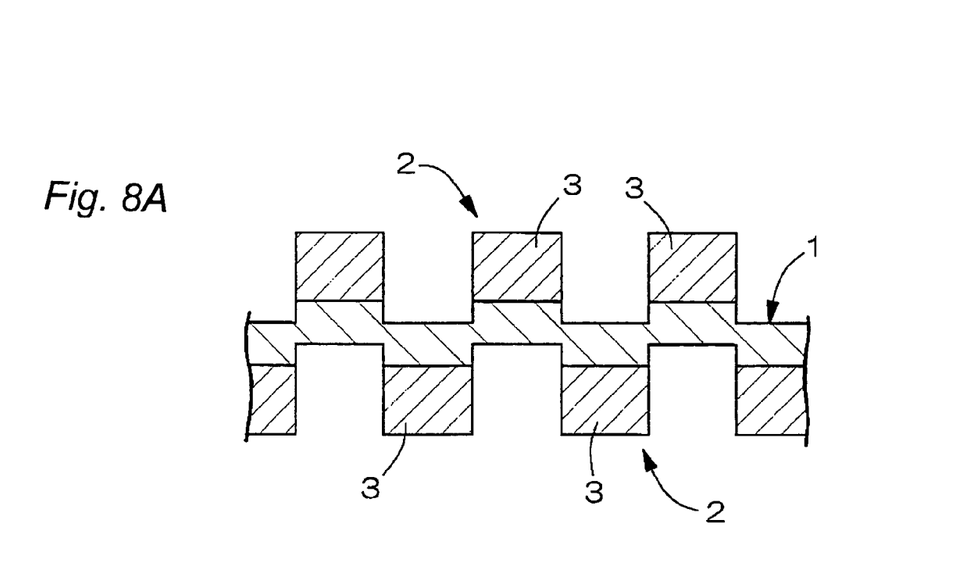
FIGS. 8A and 8B are longitudinal sectional views showing an electrode provided with dot patterns on the both sides of a current collector according to the invention.
Figure 8B:
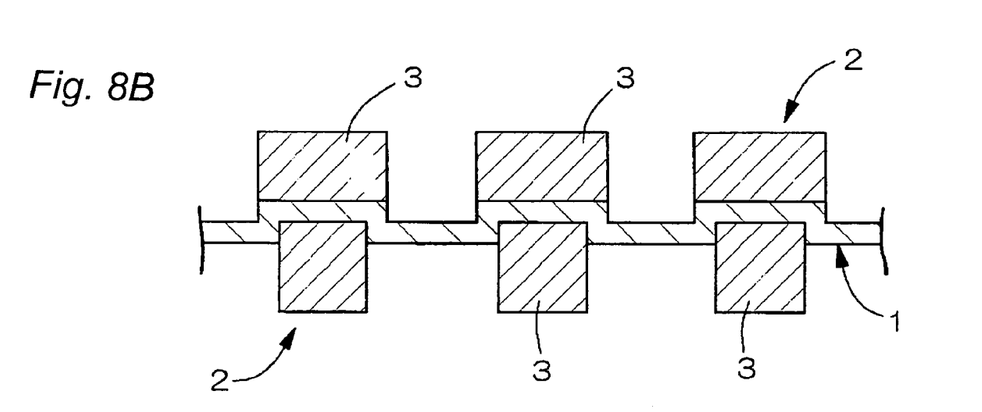

In case of a manufacture method shown in FIGS. 6 and 7, according to the characteristics of the resulting electrode, a refined pattern can be selectively formed in the same way as FIG. 3. it is advantageous that the same processing given to a surface side as well as to a back side, as especially shown in FIGS. 8A and 8B makes it easy to form both sides of an electrode which has the same dot pattern or a respectively different dot pattern.

Each dot may also be formed as porosity. In case of dots having pores, it is preferable that a stress produced by volume change at the time of electric charge and discharge can be released by not only crevices around dots but also pores inside dots.

Moreover, since change of a diameter of dots at the time of the electric charge and discharge becomes small, an interval of dots can also be narrowed and also cycle characteristics can be raised by a decreased distortion at contact parts between the current collector and the dots. Furthermore, porous dots have a large specific surface area as compared with precise dots, so that a reaction area of an active material becomes large, thereby making it possible a higher rate of the electric charge and discharge.

As a production method of the above-mentioned porous dots, for example there is proposed a method of adding cellular agents, such as a surface active agent, to a plating bath. In this case, firstly electrodeposition of precise Sn or precise Sn alloy which serves as a buffer layer is carried out on a foil of copper in a plating bath which does not contain a surface active agent and then the resulting foil is subjected to an electroplating process while a surface active agent is added by a small quantity and a plating bath is agitated. And after fully rinsing dots of the resulting foil, it is subjected to a drying process at a temperature of 60 to 150° C. preferably 80 to 100° C. in a vacuum or reducing atmosphere, thereby getting a porous dot in which a surface active agent was eluted.

In case of forming the above precise buffer layer, the adhesion of porous dots of Sn or Sn alloy and copper foil can be increased.

Since it is necessary to suppress influence on volume change of Sn or Sn alloy dots due to the electric charge and discharge as much as possible, it is desirable to adjust the buffer layer up to 5% or less, preferably 1% or less of the dot height.

As the above-mentioned surface active agent, there can be used an anion type, a cation type, and a non-ion type. However, a hole rate of porous dots from which critical micelle concentration is obtained less than 0.01 wt %, and cannot form sufficient stress relaxation place. For this reason, a desirable critical micelle concentration is preferably beyond 0.01 wt %

As such an anion type material, there are listed for example sodium laurate, sodium lauryl sulfate, and sodium. As such a cation type, there are listed for example lauryl amine hydrochloride, a hexadecyl amine hydrochloride, and octadecyl trimethyl ammonium chloride. As such a non-ion type, there are listed for example polyoxyethylene decyl ether, polyoxyethylene nonyl-phenol ether.

In order to fully release an expansion stress of the above-mentioned porous dot, it is desirable to make the hole rate into 30% or more. On the other hand, since the capacity will falls down if the hole rate becomes large too much, it is preferable to limit the hole rate to 80% or less, preferably 45% to 60%.

As a formation method of various metallic materials which constitute a dot pattern represented by Sn or Sn alloy, a physical vapor growth (PVD), a chemical vapor deposition (CVD), a liquid-phase-epitaxy method and so on are listed. A plating method (metal electroplating, electroless plating), an anode oxidation method, a coating method, a sol gel process, etc. are listed as the examples of the liquid-phase-epitaxy methods, CVD, MOCVD, RF plasma CVD, ECR plasma CVD, Light CVD, and Lasers CVD and ALE are listed as the examples of the chemical vapor deposition, a vacuum deposition method, a sputtering method, an ion plating method, a MBE method, and a laser ablation method are listed as the examples of the physical vaper growth. If the electroplating method is used especially, dots of Sn or Sn alloy with very high adhesion with a current collector can be obtained.

When a copper foil is used for the current collector, a Cu—Sn alloy is formed between layers by an after treatment of heating, thereby avoiding exfoliation between the current collector and the active material due to the electric charge and discharge.

As an active material of the positive electrode used for this invention, for example, there are listed lithium cobalt oxides such as $LiCoO_2$ etc, lithium manganese oxide such as $LiMn_2O_4$ etc, lithium nickel oxide such as $LiNiO_2$ etc, $LiNiO_2$ $LiNi_xCo_{1-x}O_2$ in which a part of Nickel in $LiNiO_2$ is replaced by Co, $MnO_2$, $LiNi_xMn_yCo_{1-x-y}O_2$ which is a stratified MnNi oxide, metal oxides such as a vanadium pentoxide and a chromic oxide, metal sulfides such as a titanium disulfide and a molybdenum disulfide. A mixture which comprises the positive material added with binders and an electric conduction assistant such as a polyvinylidene fluoride, etc is applied to a core material of aluminium foil used for a current collection material to form a molding body.

As a solvent of an electrolyte used for this invention, 1,2-dimethoxy ethane, 1, 2-diethoxy ethane, propylene carbonate, ethylene carbonate, gamma-butyrolactone, tetrahydrofuran, 1,3-dioxolane, diethyl carbonate, dimethyl carbonate, ethyl methyl carbonate, etc. are listed, for example, and combination of two or more can be used. Moreover, unless the purpose of this invention is spoiled, it is also possible to add other components. As an electrolytic solute, for example $LiClO_4$, $LiPF_6$, $LiBF_4$, $LiAsF_6$, $LiSbF_6$, $LiCF_3SO_3$, $LiC_4F_9SO_3$, $LiCF_3CO_2$, $Li_2C_2F_4(SO_3)_2$, $LiN(CF_3SO_2)_2$, $LiN(CF_3SO_2)_2$, $LiCnF_{2n+1}SO_3(n>=2)$, $LiN(RfOSO_2)_2$ wherein Rf is a fluoro alkyl group, $LiN(CF_3SO_2)(C_4F_9SO_2)$, $LiN(C_2F_5SO_2)(C_4F_9SO_2)$, $LiN(CF_3SO_2)(C_2F_5SO_2)$, etc. are listed here. Furthermore, as an electrolyte, a transporter of Li ion can be used for the invention without restrictions, and a gel polymer electrolyte consisting of various polymers, an intrinsic polymer electrolyte, and an inorganic solid electrolyte such as LIPON, Li-ion contented ordinary temperature fused salt, etc. are listed.

As a separator, a material having an enough hardness and a capacity for holding a plenty of electrolytes is preferred, and for example a non-woven fabric and a separator is preferably made from a polypropylene, a polyethylene or a copolymer of polypropylene and polyethylene to have a thickness of 5-50 micrometers and an opening rate of 30-70%.

The present invention will be explained by way of examples with reference to the accompanying drawings. It is to be noted here that various changes and modifications will be apparent to those skilled in the art. Therefore, the following examples show typical embodiments of this invention as mere illustration for explanation and this invention is not restricted to these.

EXAMPLE 1

Figure 9:
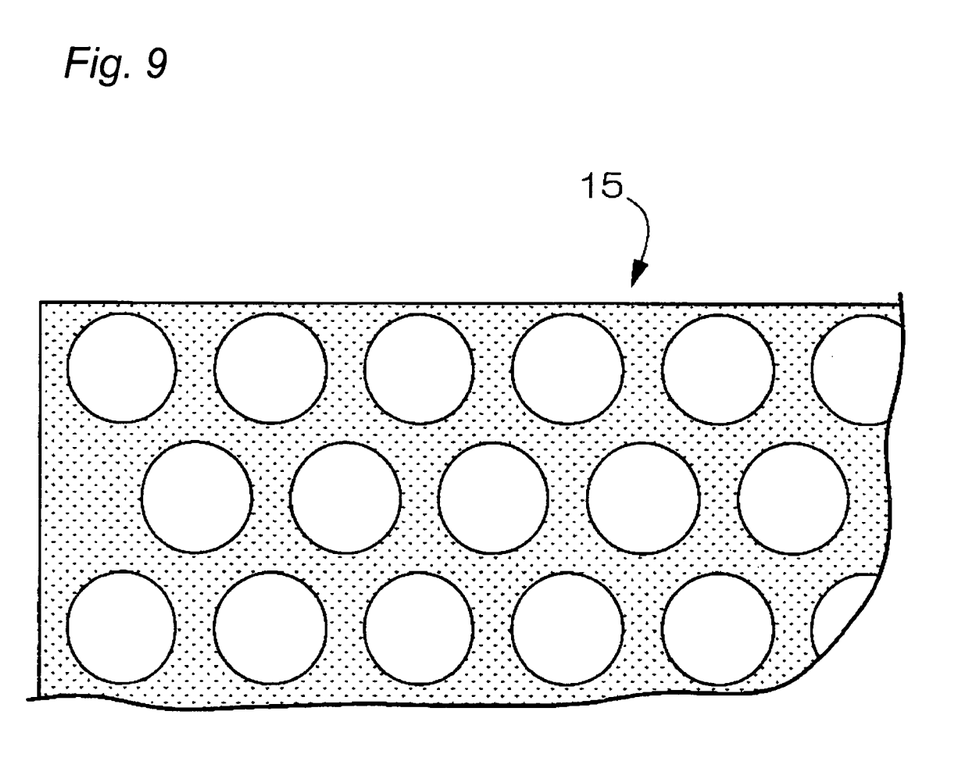
FIG. 9 is a plan view of a mask pattern for a patterning processing.

10 micrometers of photo-resist coating was applied to a foil surface of copper and is subjected to an exposition and development with a mask 15 having a pattern as shown in FIG. 9.

After cutting this foil to flags of 5 cm×5 cm square in size, in order to remove a surface oxide skin, fats and oils, and a soil, the flags is immersed for 4 minutes into 10% concentration sulfuric acid heated at 40° C. Then, the flags are subjected to a cathode electrolytic degreasing for a minute at 5-10 A/dm$^2$ in a bath of degreasing liquid which comprises 5 g/l of heated sodium hydroxide, 20 g/l of ortho sodium silicate, 10 g/l of sodium carbonate (anhydrous), and 1 g/l of n-dodecyl trimethyl ammonium chloride at 60° C.

After rinsing the foils of copper with distilled water, they were again immersed into 10% sulfuric acid to remove an alkali neutralization and a surface active agent on the copper surface of foil completely. The resulting foil is used for a current collector which is subjected to a metal electroplating.

The foils are immersed into a plating bath containing 40 g/l. of zinc sulfate, 60 g/l of sulfric acid, 40 g/l of cresol sulfonic acid, and 2 g/l of gelatin, and 1 g/l of β-naphthol and subjected to a cathode metal plating at 1 A/dm2 of a current density for 500 minutes.

Then, a residual resist was removed and an electrode which has a dot pattern of the shape of a hound's-tooth check consisting of cylindrical dots (height: 10 micrometer, diameter: 20 micrometer, and interval: 5 micrometer between dots) of Sn was obtained. That is, this Sn dot electrode has a detailed dot pattern as shown in FIG. 3D.

The electrode is transferred into a vacuum inert-gas-replacement furnace after removing residual metal-plating liquid of the electrode by rinsing. Then, the electrode is subjected to a reduced pressure heat treatment at 200° C. for 12 hours, to make an alloy of Sn and Cu at an interface of the dots and the current collector and then the resulting products are transferred to a dry box in argon atmosphere, and punched to a disk with a diameter of 16 mm, as a negative electrode.

EXAMPLE 2

A metal plating of Sn is performed on a foil of copper according to the same patterning as Example 1 and the same conditions as Example 1 except a diameter of a pattern being 150 micrometers and pitch width being 15 micrometers. Then, the plated product is subjected to the same heat-treatment as the Example 1 and an electrode which has a dot pattern of the shape of a hound's-tooth check which consists of cylindrical dots (height: 6 micrometer, diameter: 150 micrometer, and interval: 15 micrometer between dots) was obtained.

The resulting product was subjected to the same alloying processing as Example 1 and punched into a disk with a diameter of 16 mm, as a negative electrode.

COMPARATIVE EXAMPLE 1

Except that a foil of copper before forming a pattern by photoresist has been used, Sn electrolysis metal plating and heat treatment were performed in the same condition as Example 1, and a disk-like negative electrode with a diameter of 16 mm was produced. In this case, a uniform Sn thin film with a thickness of 5 micrometers was formed on a current collector.

(Production of a Battery)

A positive electrode was prepared as follows.

A paste containing a positive mixture was prepared by mixing $LiCoO_2$ of 90 weight portions as a positive active material, carbon black of: 6 weight portions as an electric conduction assistant, and poly vinylidene fluoride of 4 weight portions as a binder, and N-methyl pyrolidone of 40 weight portions as a solvent to be uniform.

The paste was applied on a foil of aluminium having a thickness of 20 micrometers used for a current collector to have a weight per unit area of 32 $mg/cm^2$. After drying, the resulting foil was subjected to a calender processing so as to have an electrode density 3.2 $g/cm^3$ by controlling a thickness of the positive active material and then cut into a disk having a diameter of 15 mm as a positive electrode.

An electrolyte containing 1.2 mols/l. of LiPF6 in mixture of ethylene carbonate and ethyl methyl carbonate (mixture ration of 1:2) was used A separator of EMM25 (25-micrometer thickness) made from the TONEN-SETYLA Ltd. was used.

Each of Negative electrodes prepared according to Examples 1 and 2 and Comparative Example 1 was built with the above materials into a coin type of a non-aqueous electrolyte secondary battery, and various tests shown below were performed.

(Examination of Electric Discharge Capacity, Charge and Discharge Efficiency, and Cycle Characteristics)

In the charge and discharge examination, the capacity of the charge and discharge was measured at the conditions of the current density of 0.2 $mAh/cm^2$, by discharging to 3V after charging to 4.3V. The efficiency is evaluated by the ratio of the electric discharge capacity with respect to the charge capacity.

Moreover, the cycle examination was performed under said conditions and the cycle characteristics was evaluated by the rate of the electric discharge capacity at the time of 20 cycle progress with respect to the first-time electric discharge capacitytics.

(Load Characteristic)

Load-characteristic was measured by the following methods.

Each of cells of Example 1 and 2 and Comparison Example 1 was charged to 4.3V with the current density of 0.2 $mAh/cm^2$ first, and after the relaxation time for 10 minutes discharged to 2.5V by 0.2 $mAh/cm^2$, and then the capacity of each cell was checked.

Then, after charging each cell so as to reach a full charge for 5 hours, the charge and discharge was performed so as to become a full electric discharge in 5 more hours under the condition that the current density of charge and electric discharge in each cell was changed.

The current value of the charge and discharge at this time was an equivalent for 0.2 C. Under the condition that the discharge capacity is deemed to a value of 100%, the following load-characteristic evaluations were made.

Under the same condition as the above, each discharge capacity was measured at the current value of 1.0 C (this current value means a current value by which a full electric discharge can be completed in 1 hour) and the current value of 2.0 C (this current value means by which a full electric discharge can be completed in 30 minutes) and each load-characteristics was evaluated by comparing the each discharge capacity measured with the discharge capacity at the current value of 0.2 C.

An obtained result is shown in Table 1.

TABLE 1

| | Capacity [mAh/g] | Charge and discharge efficiency [%] | Load characteristic (%) | | Cycle characteristics (%) @50 cycle |
| --- | --- | --- | --- | --- | --- |
| | | | 1C discharge | 2C discharge | |
| Embodiment 1 | 900 | 95 | 85 | 80 | 90 |
| Embodiment 2 | 900 | 95 | 80 | 75 | 85 |
| Comparison example 1 | 900 | 90 | 65 | 50 | 50 |

From the Table, it is understood that the non-aqueous electrolyte secondary battery of Examples 1 and 2 has a higher efficiency of electric charge and discharge efficiency and a better performance in the load characteristic and cycle characteristics as compared with Comparative Example 1.

EFFECT OF THE INVENTION

As mentioned above, according to the electrode concerning this invention, since dots of an active material were formed by the predetermined pattern on the current collector 1, the crevice 4 formed between each dot 3 of the dot pattern 2 enables it to release the volume expansion of the active material at the time of charge. Accordingly, crack generating of an electrode and exfoliation of the active material from the current collector 1 can be avoided effectively. Moreover, the porous dots can improve further the efficiency of electric charge and discharge, the load characteristic, and the cycle characteristics.

Although the present invention has been fully described by way of examples with reference to the accompanying drawings, it is to be noted here that various changes and modifications will be apparent to those skilled in the art. Therefore, unless such changes and modifications otherwise depart the spirit and scope of the present invention, they should be construed as being included therein.

What is claimed is:

1. An electrode used for a non-aqueous electrolyte secondary battery, which comprises a current collector of a metallic material not to be alloyed with Li and a pattern of dots formed on the current collector, which is an active material of a metallic material able to be alloyed with Li,
   wherein the diameter of each dot is 1-500 micrometers,
   the shape of the dots is a cylindrical column or a cone,
   the dots are regularly arranged and also are completely separated from each other and project outward from the current collector,
   the metallic material able to be alloyed with Li is at least one element selected from the group consisting of elements of group 14 and alloy thereof, and
   the occupancy rate of the dots on the current collector is 50-90%.

2. The electrode according to claim 1, wherein the height of said dot is 1-15 micrometers.

3. The electrode according to claim 1, wherein the metallic material able to be alloyed with Li is an alloy comprising a) at least one element selected from the group consisting of Bi, Cu, Fe, Ni, Zn, and Ag and b) at least one element selected from the group consisting of elements of group 14.

4. The electrode according to claim 1, wherein the interval of each dot is 5 micrometers or more.

5. The electrode according to claim 1, wherein the dot pattern of the metallic material able to be alloyed with Li is formed on a current collector having a pattern of concave or convex.

6. The electrode according to claim 1, wherein each of the dots is porous.

7. A non-aqueous electrolyte secondary battery which comprises positive and negative electrodes, the negative electrode comprising a current collector of a metallic material not to be alloyed with Li and a pattern of dots formed on the current collector, which is an active material of a metallic material able to be alloyed with Li,
   wherein the diameter of each dot is 1-500 micrometers,
   the shape of the dots is a cylindrical column or a cone,
   the dots are regularly arranged and also are completely separated from each other and project outward from the current collector,
   the metallic material able to be alloyed with Li is at least one element selected from the group consisting of elements of group 14 and alloy thereof, and
   the occupancy rate of the dots on the current collector is 50-90%.

8. The non-aqueous electrolyte secondary battery according to claim 7, wherein the height of said dot in the negative electrode is 1-15 micrometers.

9. The non-aqueous electrolyte secondary battery according to claim 7, wherein the metallic material able to be alloyed with Li is an alloy comprising a) at least one element selected from the group consisting of Bi, Cu, Fe, Ni, Zn, and Ag and b) at least one element selected from the group consisting of elements of group 14.

10. The non-aqueous electrolyte secondary battery according to claim 2, wherein the interval of each dot is 5 micrometers or more.

11. The non-aqueous electrolyte secondary battery according to claim 7, wherein the dot pattern of the metallic material able to be alloyed with Li is formed on a current collector having a pattern of concave or convex.

12. The non-aqueous electrolyte secondary battery according to claim 7, wherein each of the dots is porous.

* * * * *